(12) United States Patent
Miyazawa et al.

(10) Patent No.: US 6,256,412 B1
(45) Date of Patent: Jul. 3, 2001

(54) IMAGE RECOGNITION METHOD AND APPARATUS USING IMAGE ROTATION INFORMATION

(75) Inventors: Toshio Miyazawa, Kawasaki; Michiyoshi Tachikawa, Yokohama; Mayumi Nishimura, Machida, all of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 08/811,540

(22) Filed: Mar. 4, 1997

(30) Foreign Application Priority Data

Mar. 4, 1996 (JP) .................................................. 8-046093

(51) Int. Cl.[7] ........................................................ G06K 9/62
(52) U.S. Cl. ........................................... 382/216; 382/289
(58) Field of Search ..................................... 382/216, 286, 382/289, 209, 217, 218

(56) References Cited

U.S. PATENT DOCUMENTS

| 4,926,490 | * | 5/1990 | Mano ................................. | 382/289 |
|---|---|---|---|---|
| 5,038,382 | * | 8/1991 | Lipscomb ............................ | 382/216 |
| 5,784,501 | * | 7/1998 | Tanaka ............................... | 382/286 |
| 5,818,976 | * | 10/1998 | Pasco et al. ........................ | 382/289 |
| 5,872,870 | * | 2/1999 | Michael ............................. | 382/289 |
| 5,896,490 | * | 4/1999 | Hayama et al. ..................... | 382/286 |
| 5,974,169 | * | 10/1999 | Bachelder .......................... | 382/286 |
| 5,982,930 | * | 11/1999 | Neff et al. .......................... | 382/216 |
| 5,982,952 | * | 11/1999 | Nakashima ......................... | 382/289 |
| 6,002,800 | * | 12/1999 | Donelly et al. ..................... | 382/216 |

OTHER PUBLICATIONS

IEEE Transactions On Communications, vol. 36, No. 8, Aug. 1988, Image Coding Using Vector Quantization: A Review, Nasser M. Nasrabadi and Robert A. King, pp. 957–971.

* cited by examiner

*Primary Examiner*—Jon Chang
(74) *Attorney, Agent, or Firm*—Oblon, Spivak, McClelland, Maier & Neustadt, P.C.

(57) ABSTRACT

An image recognition apparatus for recognizing a specific image in an object image using image signals of the object image, the specific image having a possibility of being rotated. The image recognition apparatus includes an image information extraction unit for extracting an object image from the image signals as a candidate for recognition of the specific image and for extracting feature values from the object image using the image signals, and a match determining device coupled to the image information extraction unit for recognizing the specific image in the object image by a comparison of the extracted feature values from the object image with reference data for the specific image. The match determining device is controlled using the reference data according to an easy to determine rotation characteristic and difficult to determine rotation characteristic in the reference data for the specific image.

19 Claims, 21 Drawing Sheets

IMAGE RECOGNITION METHOD AND APPARATUS USING IMAGE ROTATION INFORMATION

CROSS REFERENCES TO RELATED APPLICATIONS

This application claims priority to Japanese Patent Application 8-46093 filed Mar. 4, 1996 and is related to U.S. patent application Ser. No. 08/354,878 filed Dec. 14, 1994, now abandoned, both of which are incorporated herein by reference.

BACKGROUND OF THE INVENTION

1. Field of the Invention

The present invention relates to an image recognition method and apparatus for extracting and recognizing a specific image such as disclosed in U.S. patent application Ser. No. 08/354,878. This invention is more particularly related to an image recognition method and apparatus which examines a characteristic of an image indicating whether it is difficult to determine whether the image is rotated during a recognition process.

2. Discussion of Background

In recent years there has been a development in the recognition of specific color images using a color image processing apparatus such as a personal computer system with an image scanner. In order to accomplish color image recognition, several techniques which recognize and detect specific images in an object image are provided in a color image processing apparatus. Once the specific image is detected in the object image, the color image processing apparatus generates a recognition result indicating that the object image matches image information in a recognition dictionary for the specific image. Such a color image processing apparatus is disclosed in U.S. patent application Ser. No. 08/354,878.

However, it has been determined through experiments by the present inventors that, if the object image is rotated, there are problems in the recognition process between the object image data and the image information in the recognition dictionary for the specific image. For example, it has been found that in cases where the object images are rotated, consistent recognition results have not been achieved by previous devices.

SUMMARY OF THE INVENTION

Accordingly, one object of the present invention is to provide a novel and efficient method and apparatus for improving recognition accuracy of a specific image within an object image using characteristics of image rotation.

Another object of the present invention is to provide an image recognition method and apparatus using the characteristics of rotation of the extracted object image in a color image recognition process.

The above and other objects are achieved according to the present invention by providing a new and improved image recognition apparatus and method for recognizing a specific image in an object image using input image signals of the object image, the specific image having a possibility of being rotated. The image recognition apparatus includes an image information extraction unit for extracting an object image from the input image signals as a candidate for recognition of the specific image and for extracting feature values from the object image using the input image signals, and a match determining device coupled to the image information extraction unit for recognizing the specific image in the object image by a comparison of the extracted feature values from the object image with reference data for the specific image. The match determining device is controlled using the reference data according to an easy to determine rotation characteristic and difficult to determine rotation characteristic in the reference data for the specific image.

The present invention samples the input image provided by an image input device such as a scanner using red, green and blue image signals. An object image data which is represented by a circumscribing quadrangle and an inscribing quadrangle is extracted from the input image signals. The coordinates of the object image are extracted from the image data and are used to determine the size of the object image to be recognized.

The present invention stores characteristics of rotation of the object image in a recognition dictionary as predetermined reference data. The predetermined reference data includes, for example, a flag which indicates a rotation characteristic of the extracted object image. The flag is used to determine whether the object image has an easy to determine rotation characteristic or a difficult to determine rotation characteristic for facilitating the image recognition process.

BRIEF DESCRIPTION OF THE DRAWINGS

A more complete appreciation of the invention and many of the attendant advantages thereof will be readily obtained as the same becomes better understood by reference to the following detailed descriptions when considered in connection with the accompanying drawings, wherein:

FIGS. 7a through 7c illustrate chromaticity and vector quantization histograms of the small areas of FIGS. 6a and 6b extracted during vector quantization processing;

DESCRIPTION OF THE PREFERRED EMBODIMENTS

Figure 1:
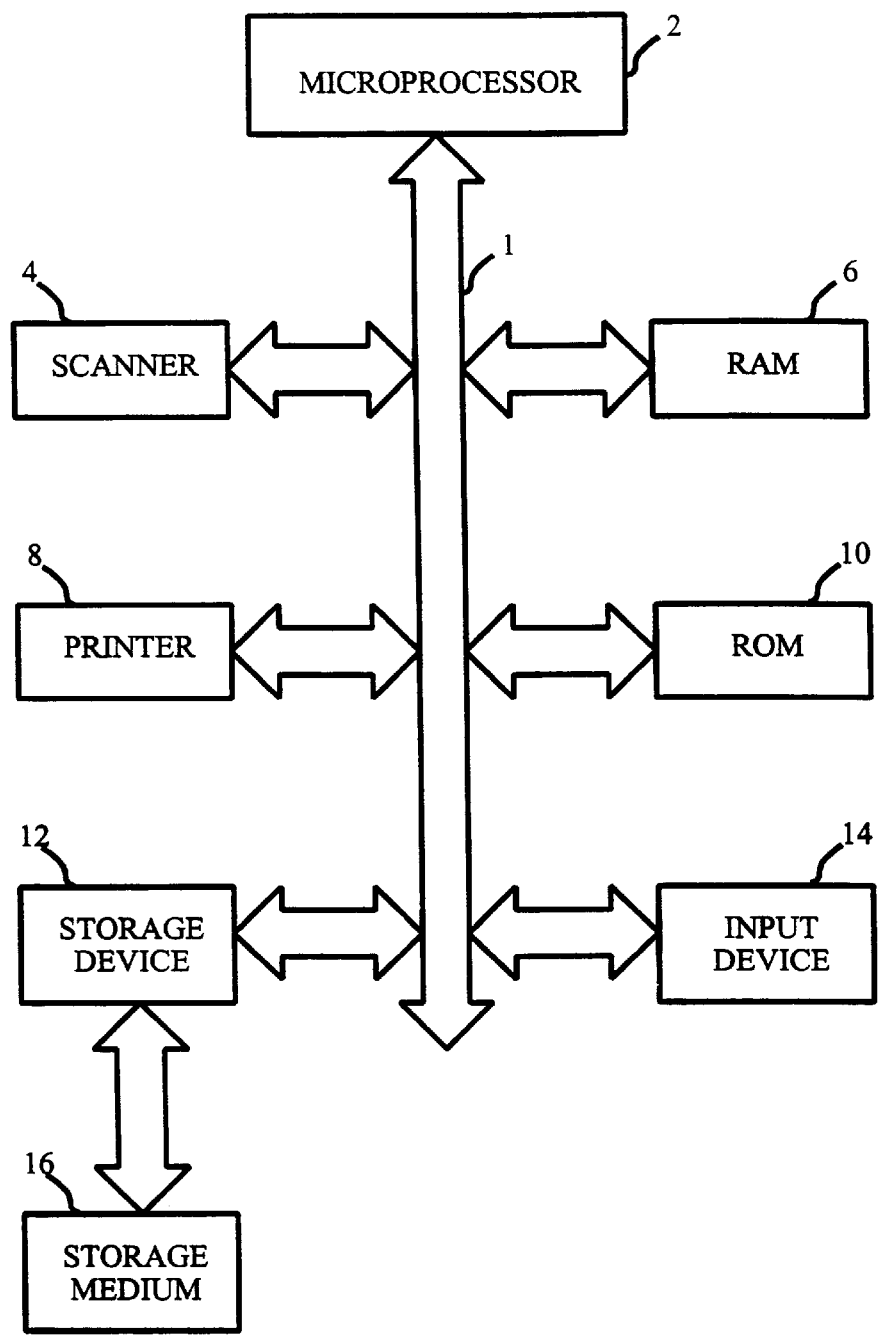
FIG. 1 illustrates a system block diagram of the image recognition apparatus according to the present invention.

Referring now to the drawings, wherein like reference numerals designate identical or corresponding parts throughout the several views, and more particularly to FIG. 1 thereof, there is illustrated an image recognition and printing system according to the present invention including a microprocessor 2, a scanner 4, a RAM 6, a printer 8, a ROM 10, a storage device 12, an input device 14, and a storage medium 16. In FIG. 1, the microprocessor 2 is coupled to the scanner 4, the random access memory (RAM) 6, the read only memory (ROM) 10, the printer 8, the storage device 12, and the input device 14 through a bus 1. The storage medium 16 is coupled to the storage device 12. The ROM 10 and/or the storage medium 16 are used to store the computer instructions used to perform the process of the invention. Further, the storage medium 16 is implemented using any suitable drive medium such as a magnetic disk, an optical disc, or a magneto-optical disk, for example. The components shown in FIG. 1 are components which are typically found in a personal computer system having a scanner.

Figure 2A:
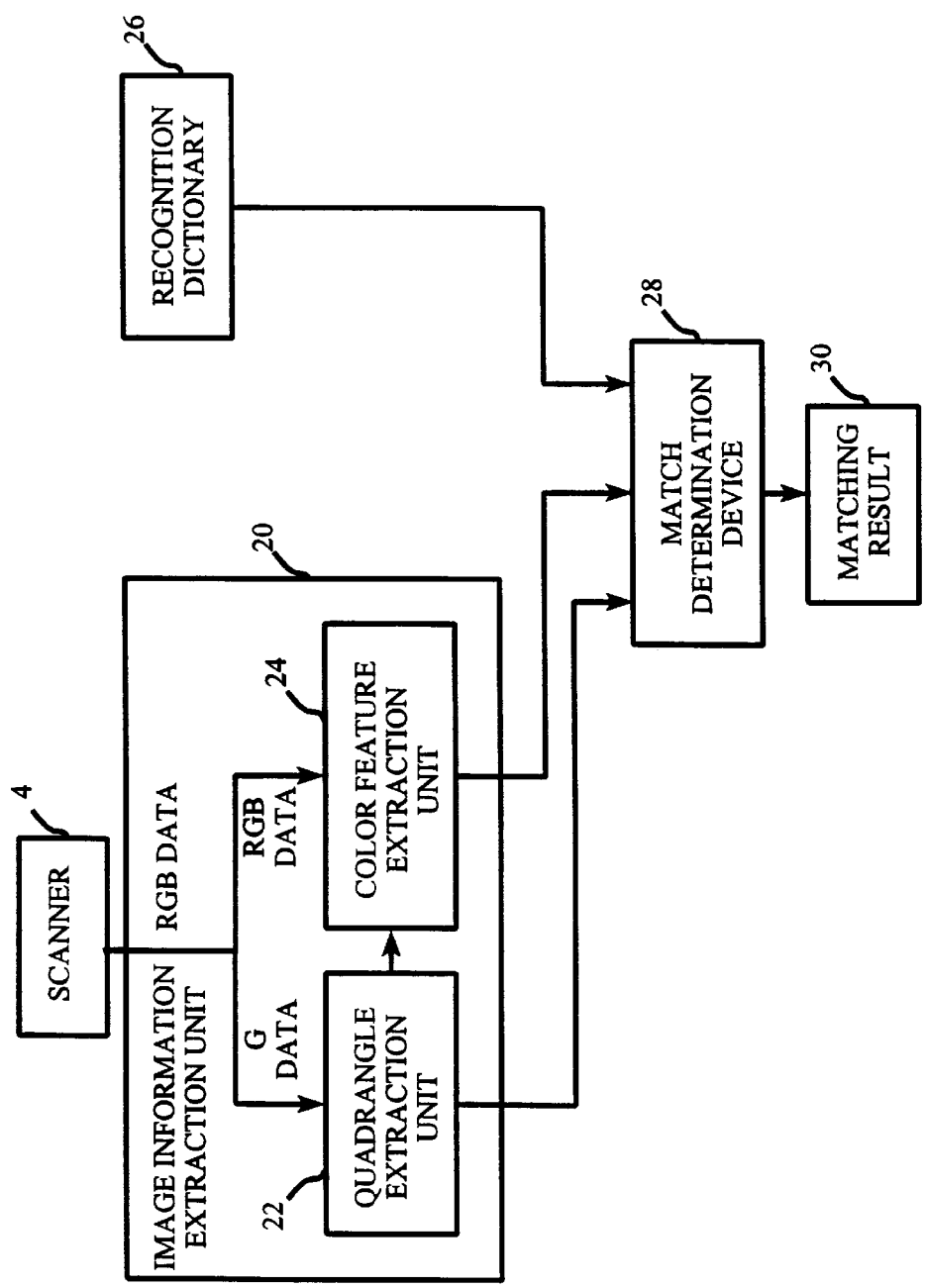
FIG. 2a illustrates a detailed block diagram of the image recognition apparatus implemented on the system of FIG. 1 according to the present invention.

FIG. 2a is a detailed block diagram of the image recognition apparatus according to the present invention as implemented on the system of FIG. 1. In FIG. 2a, the image recognition apparatus according to the present invention includes the scanner 4, an image information extraction unit 20, a recognition dictionary 26, a match determination device 28, and a matching result 30.

In FIG. 2a, the scanner 4 is coupled to the image information extraction unit 20 which is coupled to the match determination device 28. The recognition dictionary 26 is coupled to the match determination device 28 and the match determination device 28 provides a matching result 30. The image information extraction unit 20 includes quadrangle extraction unit 22 and color feature extraction unit 24. The scanner 4 provides RGB data (red, green, blue signals) to the image information extraction unit 20. The image information extraction unit 20 receives the RGB data from the scanner 4 and provides the RGB data to the color feature extraction unit 24 and provides the green signal data to the quadrangle extraction unit 22. The reason the green signal is used is because the green signal provides a maximum contrast for determining the outline of the object image on various backgrounds. The quadrangle extraction unit 22 uses the green data to determine quadrangle information for the scanned image and the color feature extraction unit 24 uses the RGB data for extracting color features of the scanned image used in the recognition process. The information from the quadrangle extraction unit 22 and the color feature extraction unit 24 is provided to the match determination device 28 which compares the information provided from the quadrangle extraction unit 22 and the color feature extraction unit 24 against reference data stored in the recognition dictionary 26 to determine if an image recognition match has occurred and provides the matching result 30.

Figure 2B:
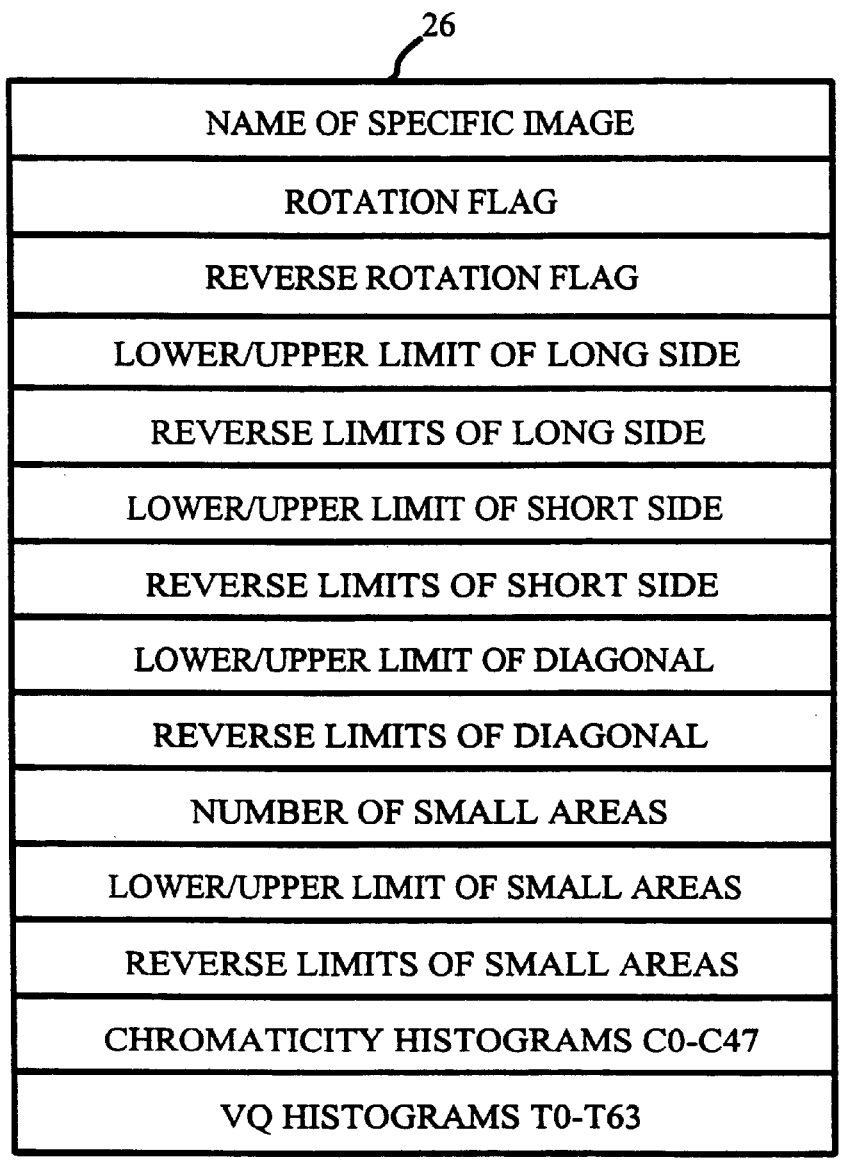
FIG. 2b illustrates a data structure used to implement a recognition dictionary of the image recognition apparatus of FIG. 2a according to the present invention.

FIG. 2b illustrates a data structure used to implement the recognition dictionary 26 of the image recognition apparatus of FIG. 2a according to the present invention. The recognition dictionary 26 may be implemented with a data structure as in FIG. 2b in a memory device such as ROM 10 or RAM 6 of FIG. 1. The contents of the reference data in the data structure of FIG. 2b in the recognition dictionary 26 include, for example, the following:

(1) name of specific image to be recognized (such as an identification card, driver's license, etc.);
(2) rotation flag (easy to determine rotation or difficult to determine rotation);
(3) reverse background of the information in (2);
(4) lower/upper limit of the long side of inscribing quadrangle for the specific image;
(5) reverse background of the information in (4);
(6) lower/upper limit of the short side of the inscribing quadrangle for the specific image;
(7) the reverse background of the information in (6);
(8) lower/upper limit of a diagonal line of the inscribing quadrangle for the specific image;
(9) reverse background of the information in (8);
(10) number of small areas within the inscribing quadrangle of the specific image;
(11) lower/upper limit of the number of small areas in the inscribing quadrangle of the specific image;
(12) reverse background of the information in (11);
(13) histograms for chromaticity and vector quantization processing of the specific image (which corresponds to the color feature).

Figure 3A:
FIGS. 3a and 3b are examples of scanned images of an outdoor scene used to describe the operation of the image recognition apparatus according to the present invention.
Figure 3B:

FIGS. 3a and 3b show scanned images of an outdoor scene on a black background (FIG. 3a), and on a background which matches the color of the paper on which the outdoor scene is printed and appears to be white in the scanned image (FIG. 3b). In FIG. 3a, since the scanned image is placed on a black background, the borders of the scanned image of the outdoor scene are clearly defined and appear to be white. In FIG. 3b, since the scanned image is on a white background the white border of the scanned image of the outdoor scene are not seen and a different image result occurs.

Figure 4A:
FIGS. 4a and 4b are examples of scanned images of a different outdoor scene than the scene of FIGS. 3a and 3b used to describe the operation of the image recognition apparatus according to the present invention.
Figure 4B:
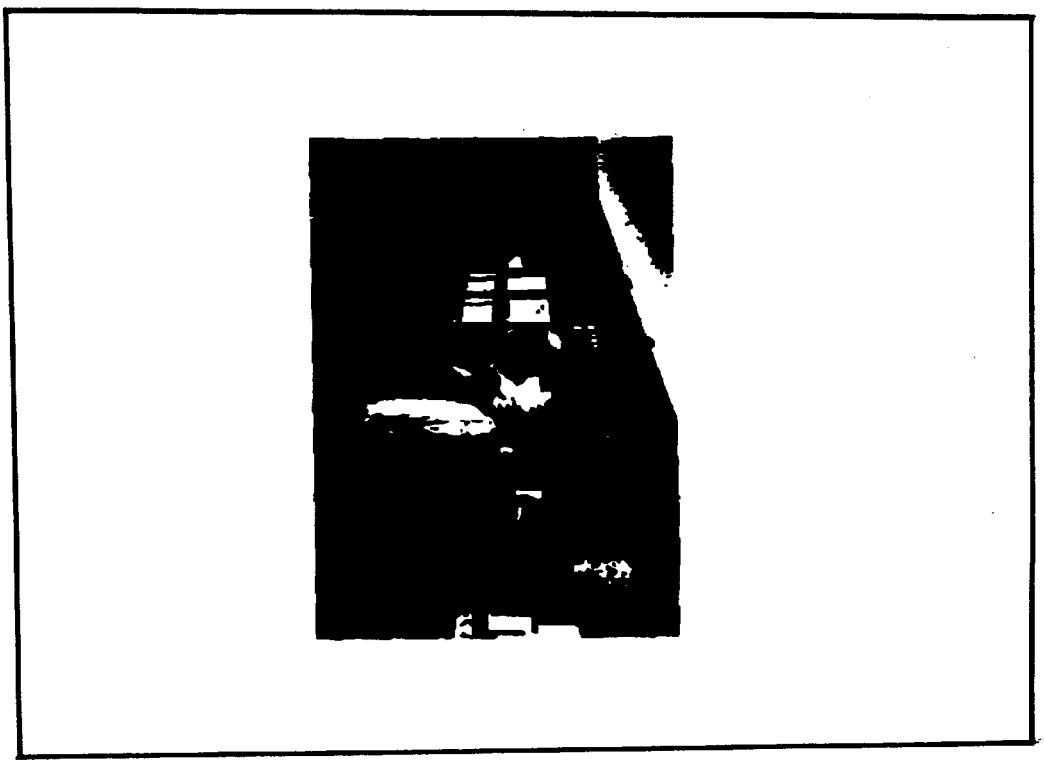

FIGS. 4a and 4b are examples of scanned images for a different outdoor scene as compared to the outdoor scene of FIGS. 3a and 3b. As can be seen from FIGS. 3a, 3b, 4a and 4b, depending on the scanned image, the inscribing quadrangle information that needs to be extracted varies depending on whether the object image is on a black or white background since the object image outline changes according to the color of the background.

The recognition dictionary 26 stores a plurality of reference data with respect to each specific image that is to be recognized. Each reference data in the recognition dictionary 26 includes several feature values in accordance with information extracted by the quadrangle extraction unit 22 and the color feature extraction unit 24. For example, the recognition dictionary 26, includes thresholds for determining image rotation based on the coordinates of the data extracted from the inscribing quadrangle of the object image, the number of small areas within the inscribing quadrangle of the object image and the chromaticity and vector quantization histograms of the object image for each specific image that is to be recognized. The reference data is provided by sampling specific images which are to be recognized according to the present invention.

Generally, the specific image includes some components such as images of people, or a picture of an object, or graphics therein. If the components of the specific image are well regulated, for example, as shown in FIGS. 3a and 4a, it is typically easy to extract the quadrangle information from an object image. For example, as shown in FIGS. 3a and 4b, a frame surrounding the specific image to be analyzed allows, for example, easy recognition of the quadrangle information of the object image. For these types of images, the present invention provides a flag of easy to determine rotation in the recognition dictionary 26 with reference to the data for a specific image.

On the contrary, if the components of a specific image exist in a dispersed fashion, for example, as shown in FIGS. 3b and 4a, it is difficult to extract the quadrangle information which represents the object image. For these types of images, the invention provides a flag of difficult to determine rotation in the recognition dictionary 26 with reference to the data for a specific image.

In addition, thresholds for the color features of the specific image and for the processing of the RGB signals of the object image in accordance with the color feature extraction unit 24 of the present invention are determined and stored in the recognition dictionary 26. Thresholds for determining image rotation about the inscribing quadrangle of the object image, such as an upper and lower limit of the long side of the extracted inscribing quadrangle of the object image and the upper and lower limit of the diagonal line of the extracted inscribing quadrangle of the object image are extracted from the green signal provided by scanner 4 to the quadrangle extraction unit 22.

Further, the recognition dictionary 26 stores features representing the reverse information of the specific image, for example, as shown in FIGS. 3b and 4a. This is done because if the specific image is placed on a white or black background, the color feature extraction and the quadrangle extraction is affected. In other words, the color features and the inscribing quadrangle information are provided for a white background image as well as a black background image and are stored in the recognition dictionary 26.

The match determination device 28 provides for the matching process which compares the color features and the quadrangle information of the object image against the information in the recognition dictionary 26 for specific images. The inscribing quadrangle of the object image extracted by the quadrangle extraction unit 22 and the color features of the object image extracted by the color feature extraction unit 24 are compared with the data in the recognition dictionary 26. The match determination device 28 provides a recognition result 30 based on the matching process performed by the match determination device 28. The match determination device 28 may be implemented, for example, by the microprocessor 2 shown in FIG. 1 with appropriate programming of instruction code or software in the RAM 6 or the ROM 10. The match determination device 28 may also be implemented using dedicated hardware devices rather than with a microprocessor and appropriate software.

Figure 5A:
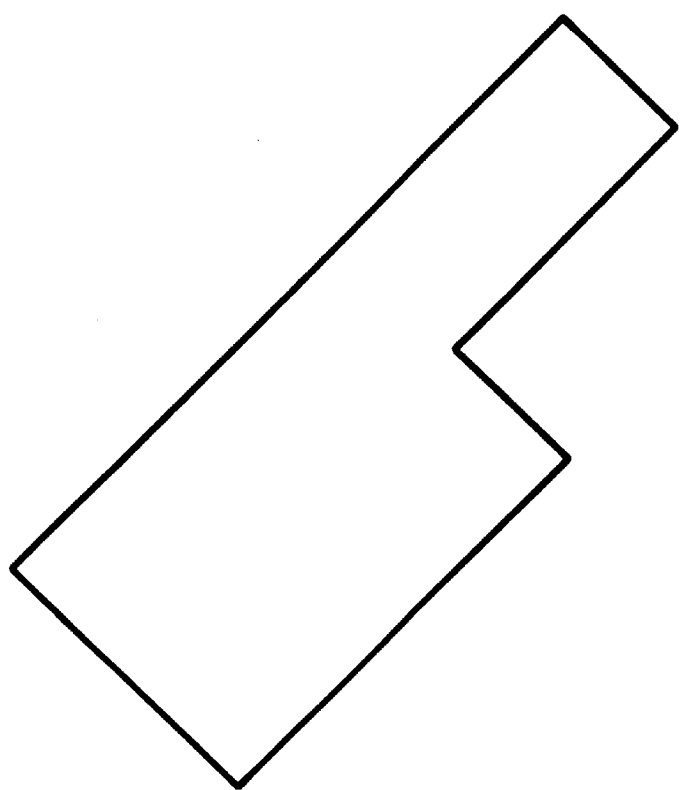
FIG. 5a is a diagram of an extracted object image according to the present invention.
Figure 5B:
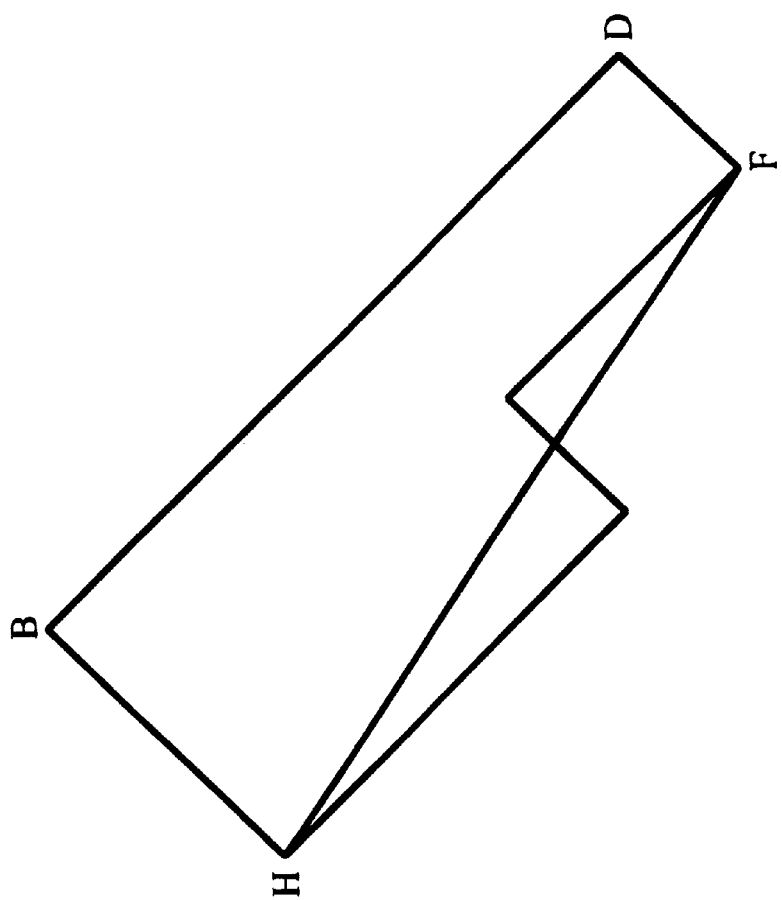
FIG. 5b is a diagram of an extracted inscribing quadrangle determined from the extracted object image of FIG. 5a according to the present invention.
Figure 5C:
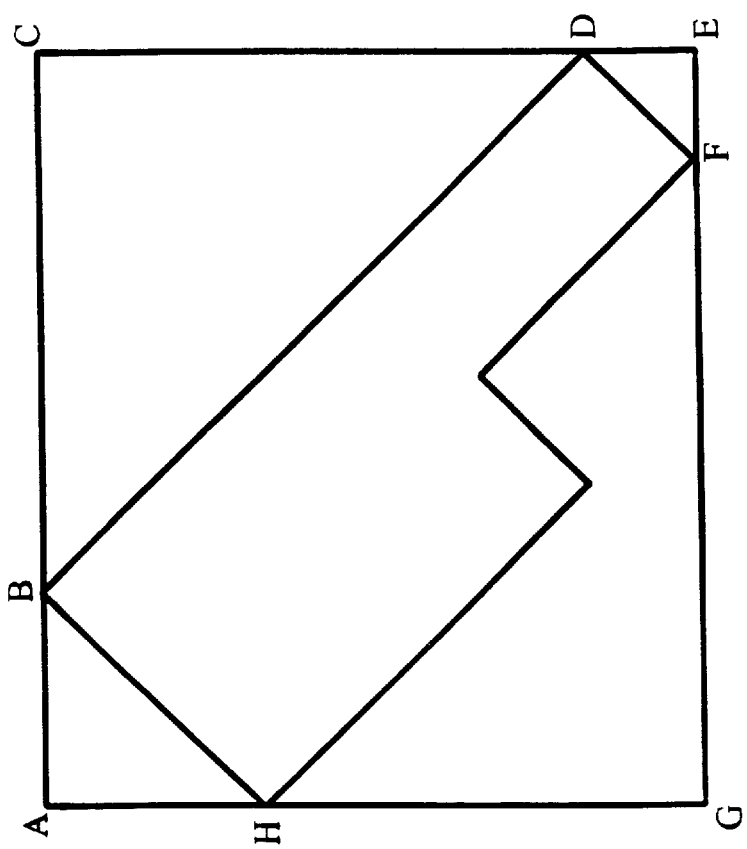
FIG. 5c is a diagram of an extracted circumscribing quadrangle determined from the extracted inscribing quadrangle of FIG. 5b according to the present invention.

FIGS. 5a through 5c are used to illustrate the operation of quadrangle extraction (e.g., as disclosed in U.S. patent application Ser. No. 08/354,878) by the quadrangle extraction unit 22 of the image information extraction unit 20 of FIG. 2a according to the present invention.

In FIG. 5a, a scanned image is processed on a pixel by pixel basis by the quadrangle extraction unit 22 to determine the object image. For example, if a scanned image such as shown in FIGS. 3a, 3b, 4a or 4b is processed by the quadrangle extraction unit 22, the quadrangle extraction unit 22 would generate an object image, for example, as shown in FIG. 5a.

In FIG. 5b, the extracted object image of FIG. 5a is analyzed to extract the inscribing quadrangle BDFH. In FIG. 5c, from the inscribing quadrangle BDFH, the circumscribing quadrangle ACEG is determined. Once the inscribing quadrangle and the circumscribing quadrangle information is determined, the length of the short side (i.e., line DF in FIG. 5c), the long side (i.e., line HB in FIG. 5c) and the diagonals (i.e., lines BF and HD in FIG. 5c) can be determined.

The length of the short side, long side and the diagonals of the object image determined by the quadrangle extraction unit 22 are compared by the match determination device 28 against the reference data in the recognition dictionary 26 to determine if there is a match. If a match is found between the object image and the reference data in the recognition dictionary 26, it becomes known that the shape of the object image matches a shape in the recognition dictionary 26. However, further processing is required, as explained below to determine if the object image and color features thereof which have been scanned match the information in the recognition dictionary 26.

Figure 6A:
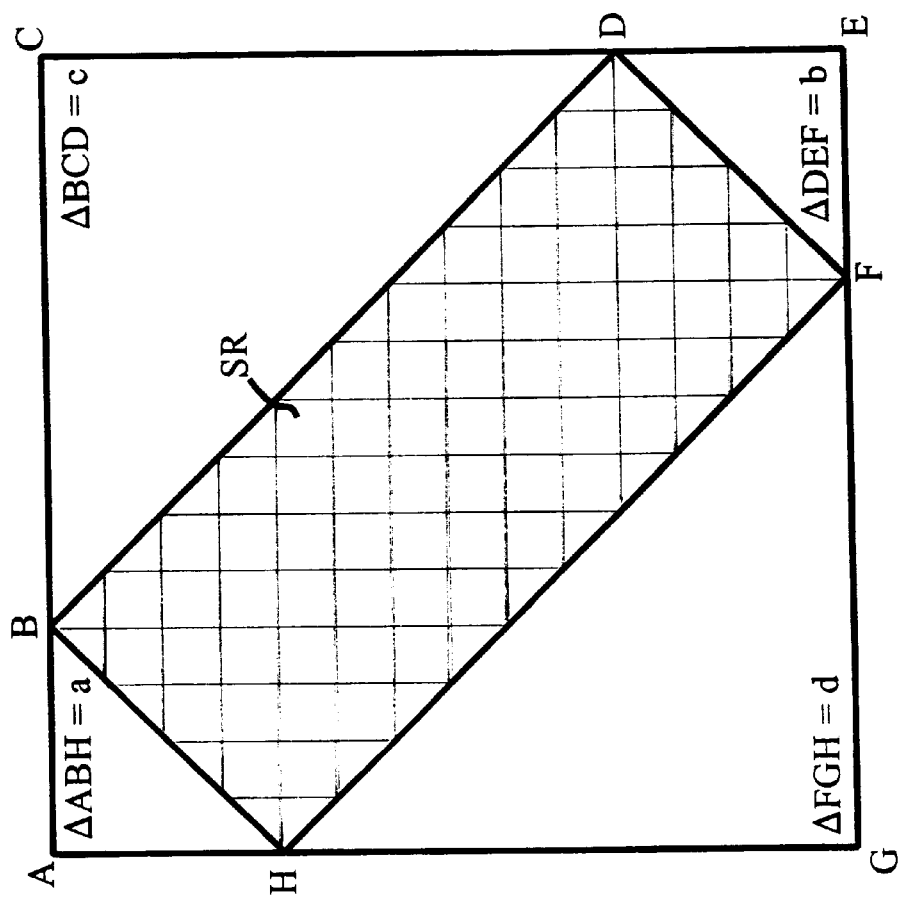
FIGS. 6a and 6b are diagrams showing inscribing and circumscribing quadrangles of an object image, the inscribing quadrangle divided into small areas, and each small area divided into pixels for vector quantization processing.
Figure 6B:
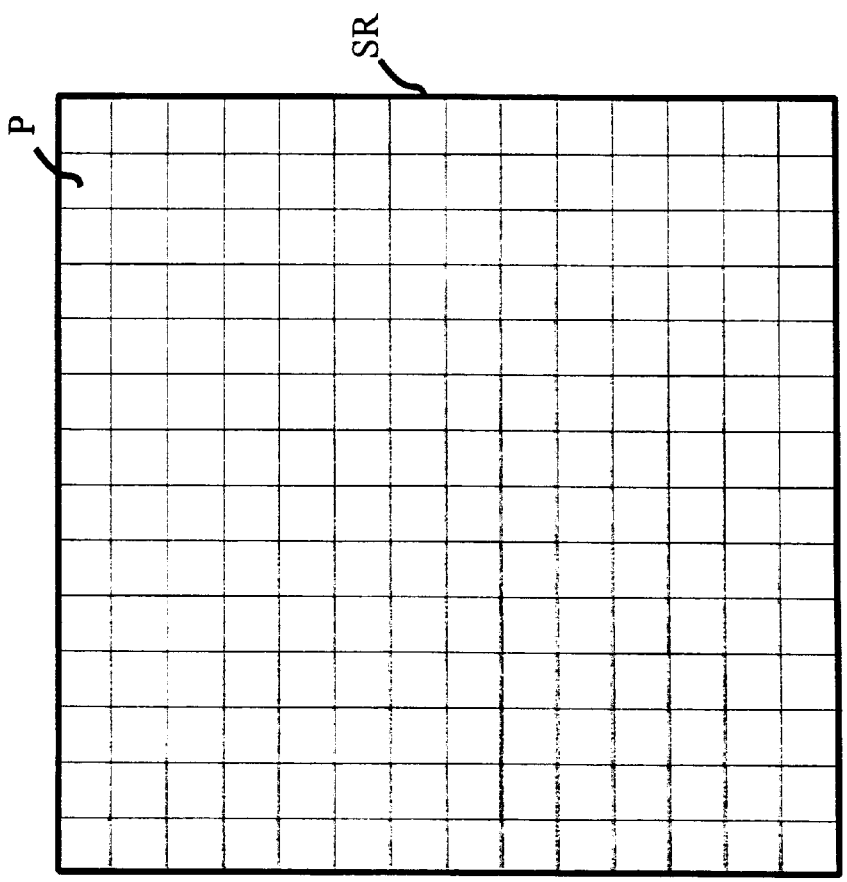

FIGS. 6a and 6b are used to describe the operation of color feature extraction (e.g., as disclosed in U.S. patent application Ser. No. 08/354,878) by the color feature extraction unit 24 according to the present invention. Coordinate information extracted by the quadrangle extraction unit 22 is provided to the color feature extraction unit 24 which uses this information along with the RGB signals from the scanner 4 to perform color feature extraction. The extracted color features include, for example, chromaticity and vector quantization histograms which will be described later.

In FIG. 6a, the inscribing quadrangle BDFH extracted by the quadrangle extraction unit 22 is divided into small regions SR for further color feature extraction processing. In FIG. 6b, each small region could, for example, be divided into a region that is 64 by 64 pixels (14 pixel by 14 pixel data is shown in FIG. 6b for simplicity). Once the color feature extraction unit 24 divides the extracted quadrangle BDFH into small regions, each small region SR is processed to extract color feature information as will be described with reference to FIG. 7a and 7b.

Figure 7A:
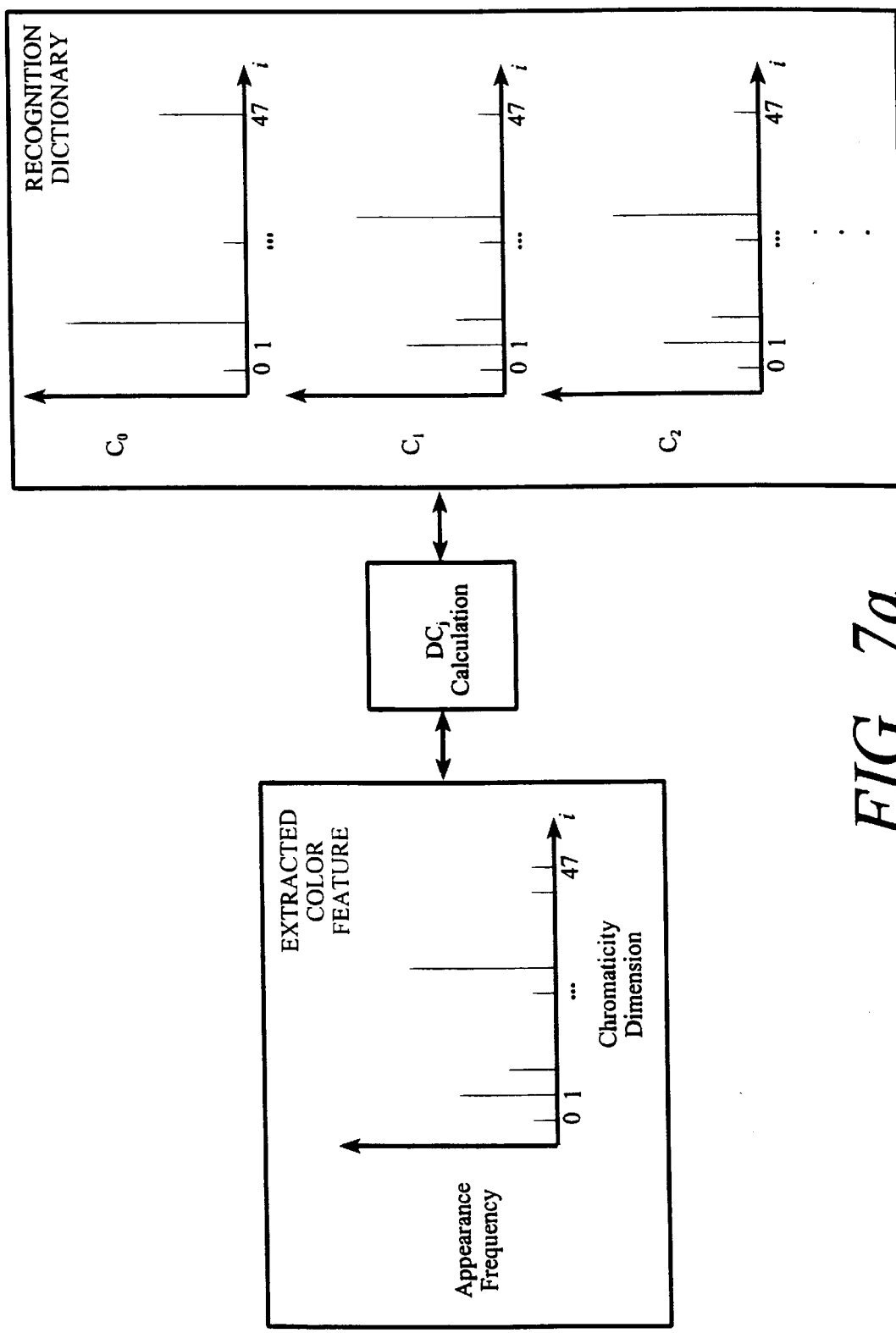

In FIG. 7a, color feature information is extracted (e.g., as disclosed in U.S. patent application Ser. No. 08/354,878) by the color feature extraction unit 24 for each small area SR of the inscribing quadrangle BDFH of FIG. 6a. However, only small areas containing color information are processed to reduce the amount of processing required during image recognition. Each small area SR of the inscribing quadrangle BDFH having color information is analyzed to determine on a pixel by pixel basis the appearance frequency of a chromaticity dimension 0 to 47. The chromaticity dimension 0 to 47 is extracted from 8-bit R, G, and B signals for each small area SR on a pixel by pixel basis, for example, as disclosed in U.S. patent application Ser. No. 08/354,878. The chromaticity dimension 0–15 (Pr), 16–31 (Pg), and 32–47 (Pb) are a measure of color intensity of the R, G and B signals with respect to a sum of the R, G, and B signals, respectively. The chromaticity dimension Pr, Pg and Pb are each represented with 8-bit data and accordingly 24-bits would be required to represent the chromaticity dimension Pr, Pg and Pb. However, each chromaticity dimension Pr, Pg and Pb is reduced to 4-bits for a total 12-bits for the chromaticity dimension Pr, Pg and Pb, for example, as disclosed in U.S. patent application Ser. No. 08/354,878.

The extracted chromaticity histogram has the chromaticity dimension 0 to 47 in the x axis plotted against the appearance frequency of each chromaticity dimension 0 to 47 for each pixel in a given small areas SR along the y axis. The extracted chromaticity histogram is next compared against code book chromaticity histograms C0 to CN stored in the recognition dictionary 26 using a DCj calculation. The DCj calculation calculates a minimal distance between the extracted chromaticity histogram for each small area SR and the chromaticity histogram stored in the code book of the recognition dictionary 26 to determine which code book entry C0 to CN has the closest match to the extracted chromaticity histogram.

The recognition dictionary 26 is used to store code book values of chromaticity histograms C0 to CN for all recognizable images and, for example, 64 code book entries C0 to C63 are stored in the recognition dictionary 26 according to the present invention. A code book with a limited number of chromaticity histograms C0 to C63 is used in order to reduce the amount of information required to be stored in the recognition dictionary 26.

Figure 7B:
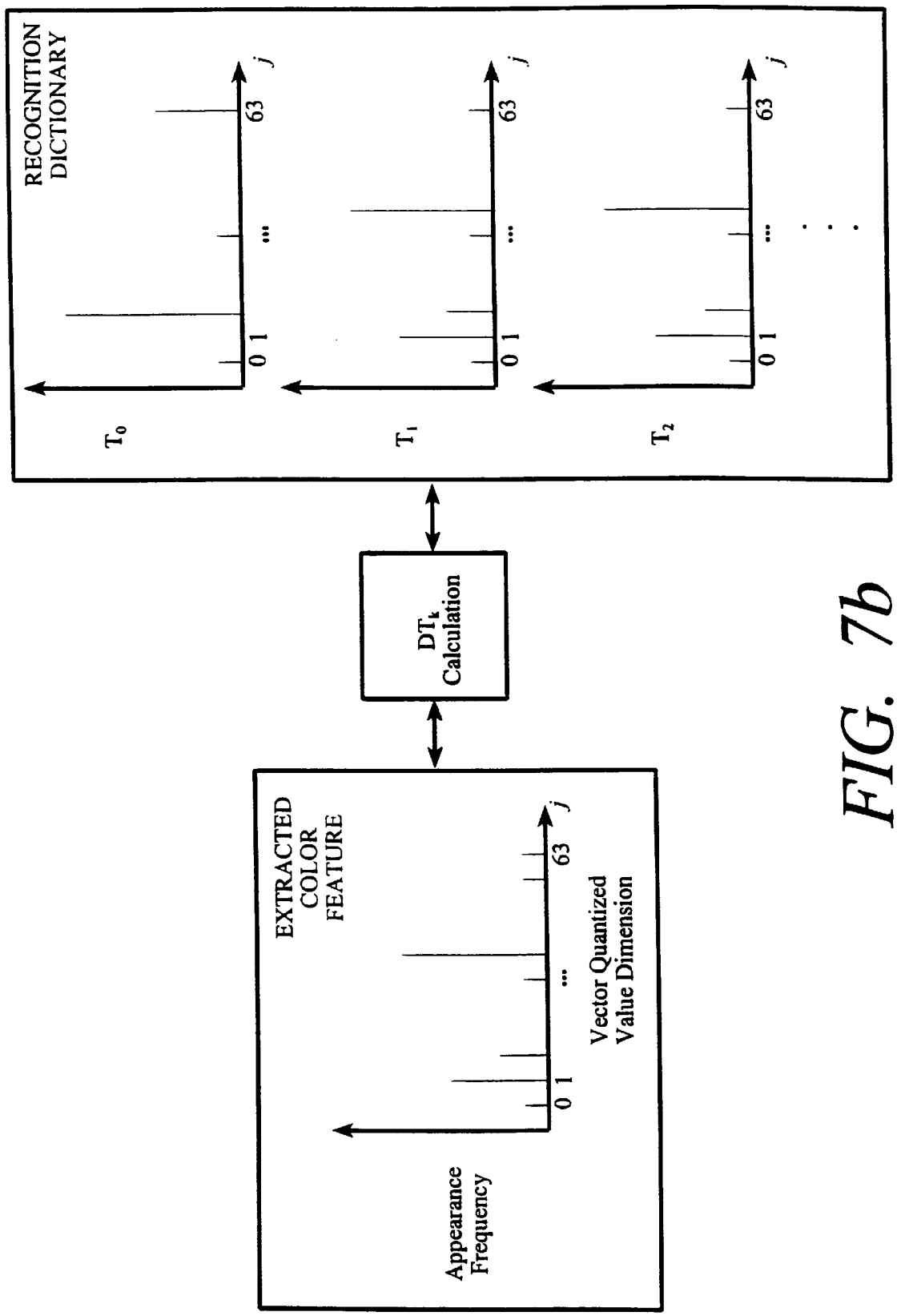

In FIG. 7b, all of the small areas SR of the inscribing quadrangle BDFH are processed and a vector quantization histogram is generated corresponding to the number of occurrences of a given code book entry for all of the small areas SR of the inscribing quadrangle BDFH. The vector quantization histogram has the code book entries C0 to C63 in the x axis plotted against the appearance frequency of the code book entries C0 to C63 for all the small areas SR of inscribing quadrangle BDFH along the y axis. The recognition dictionary 26 is used to store vector quantization histograms T0 to TN corresponding to every image which is to be recognized and the DTk calculation determines the shortest distance between the extracted vector quantization histogram of an object image and the vector quantization histograms T0 to TN stored in the recognition dictionary 26.

The recognition dictionary 26, in addition to storing length of the short side, long side and diagonals of the inscribing quadrangle BDFH of the specific images and the chromaticity and vector quantization histograms of the specific images also stores a flag which indicates whether a specific image exhibits easy to determine rotation or a difficult to determine rotation and this operation will be described with reference to FIGS. 8a through 8c.

Figure 8A:
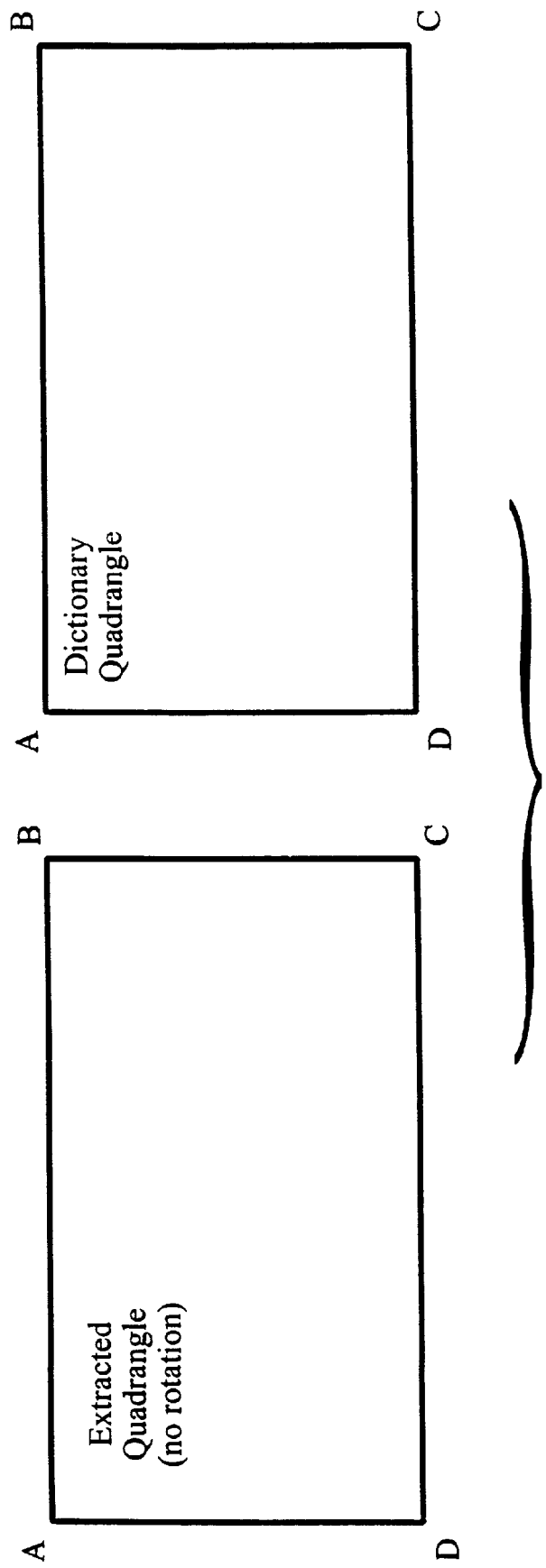
FIGS. 8a through 8c are diagrams used to describe the operation for recognizing inscribing and circumscribing quadrangles for an object image depending on whether there is easy to determine or difficult to determine rotation.

In FIG. 8a, the extracted circumscribing quadrangle ABCD of the object image which is determined to have no rotation is compared against every dictionary entry stored in the recognition dictionary 26. In this case, the match determination device 28 compares the length of the long and short sides of circumscribing quadrangle ABCD of the object image against the corresponding quadrangle information stored in the recognition dictionary 26 within predetermined limits.

For example, if the length of the long and short sides of circumscribing quadrangle ABCD are within predetermined limits stored in the recognition dictionary 26, the match determination device 28 generates a positive matching result 30 and copying of the object image is inhibited.

However, if no match is found between the object image and the quadrangle information stored in the recognition dictionary 26 for all the specific images to be recognized, the match determination device 28 generates a negative matching result 30 and copying of the object image is allowed.

The details of the determination of rotation of the object image will now be described with reference to FIG. 6a. First, rotation of the object image, it is determined by analyzing the congruity of right-angled triangles a and b in FIG. 6a using following expressions:

With the length of side AB=$\alpha$, and side EF=$\beta$

When $\alpha > \beta$, then $|\alpha - \beta| \leq \beta/4$

When $\alpha < \beta$, then $|\alpha - \beta| \leq \alpha/4$ (1)

In the same way, sides AH and DE are provided for examining condition (1). If sides AB and EF, and sides AH and DE fulfill condition (1), respectively, then the right-angled triangles a and b are determined to be congruent. Similarly, the right-angled triangles c and d would also be congruent and the requirement (1) is fulfilled.

Second, the difference of each corresponding side for the congruent triangles a and b, and c and d, that is, sides AB and EF, AH and DE, BC and FG, CD and GH, in FIG. 6a are determined using following expression:

AB–EF=D1

AH–DE=D2

BC–FG=D3

CD–GH=D4 (2)

When the minimum values of D1, D2, D3, and D4, are greater than a predetermined threshold, for example, greater than "8 pixels", then the requirement (2) is fulfilled.

Third, the length of diagonals BF and DH in FIG. 6a are examined using the following expression:

With the length side BF=$\gamma$, and side DH=$\delta$,

When $\gamma > \delta$, then $|\gamma - \delta| \leq \delta/8$

When $\gamma < \delta$, then $|\gamma - \delta| \leq \gamma/8$ (3)

If the above-mentioned conditions of expressions (1), (2), and (3) are fulfilled, the present invention determines that the inscribing quadrangle BDFH in FIG. 6a is rotated.

Figure 8B:
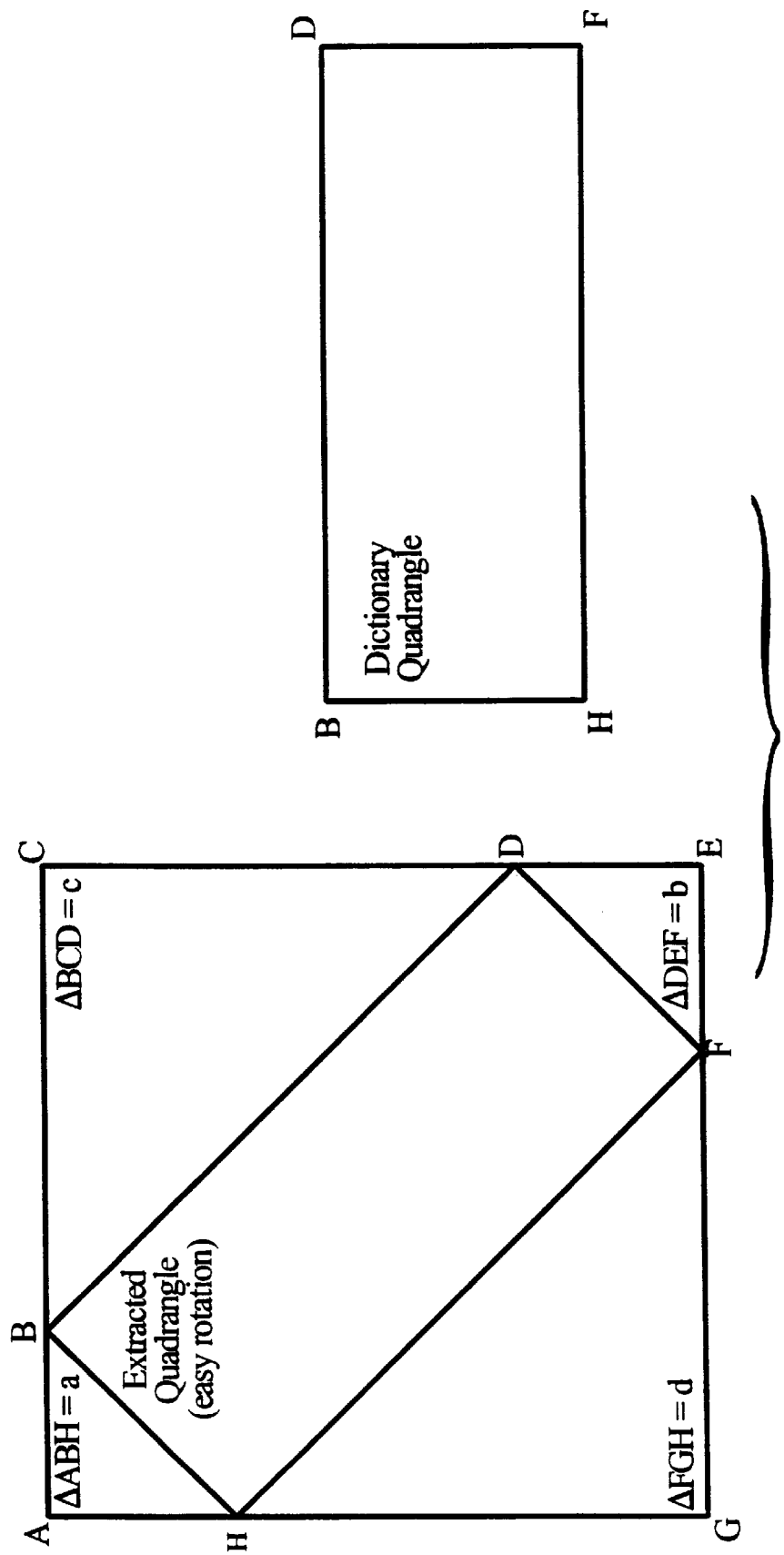

In FIG. 8b, the extracted inscribing quadrangle BDFH of the object image has easy to determine rotation and is compared against the corresponding dictionary entry stored in the recognition dictionary 26. In this case, the match determination device 28 compares the length of the long and short sides of inscribing quadrangle BDFH of the object image against the corresponding quadrangle information stored in the recognition dictionary 26 within predetermined limits. For example, if the length of the long and short sides of inscribing quadrangle BDFH are within predetermined limits stored in the recognition dictionary 26, the match determination device 28 generates a positive matching result.

Figure 8C:
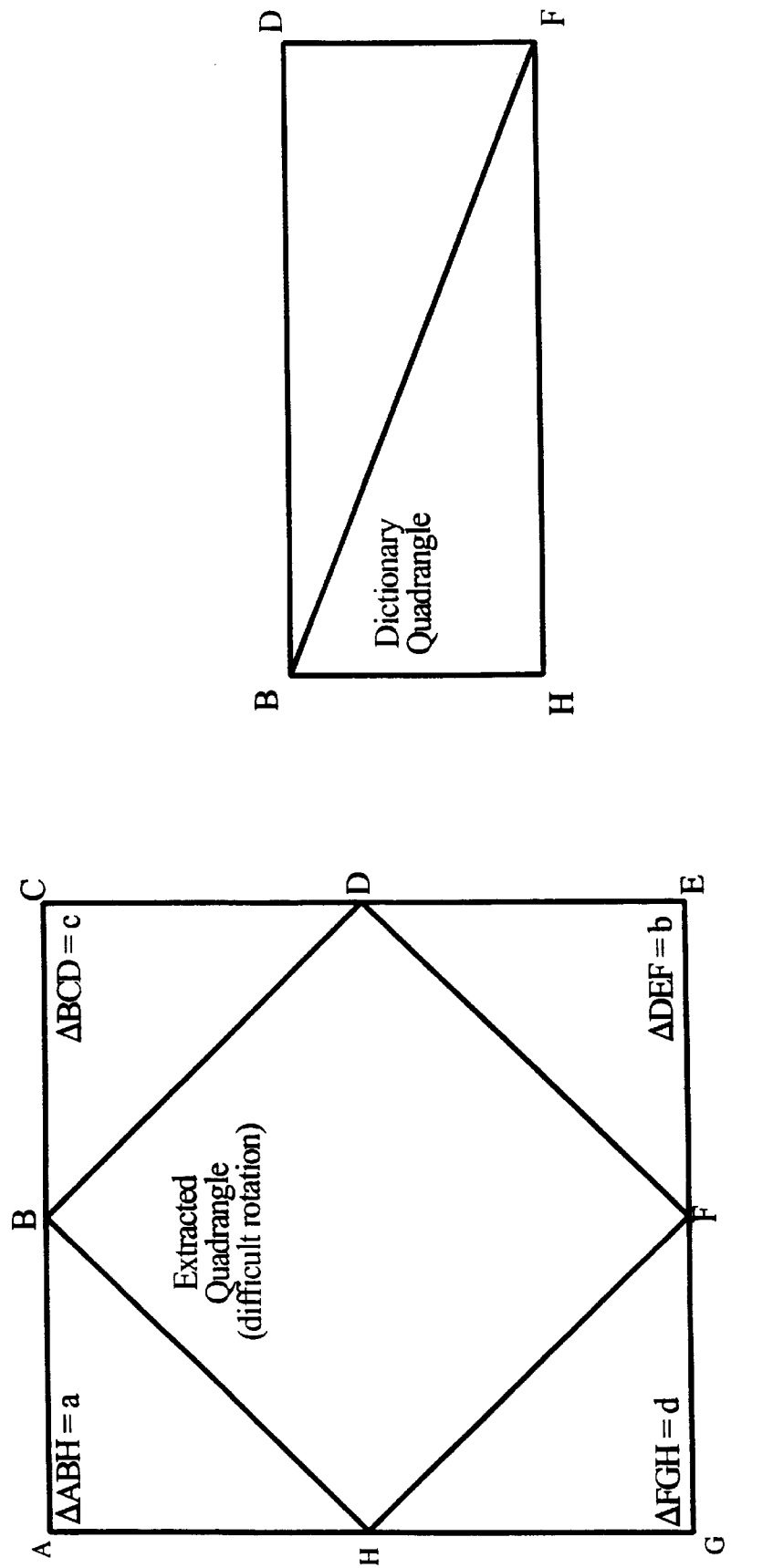

In FIG. 8c, the extracted inscribing quadrangle BDFH of the object image has difficult to determine rotation and is compared against the corresponding dictionary entry stored in the recognition dictionary 26. In this case, the match determination device 28 compares the length of the long and short sides of circumscribing quadrangle ACEG of the object image against corresponding diagonal and short side quadrangle information, respectively, stored in the recognition dictionary 26 within predetermined limits. For example, if the long and short sides of inscribing quadrangle BDFH are within predetermined limits for the diagonal and short side stored in the recognition dictionary 26, the match determination device 28 generates a positive matching result.

The operation of the image recognition device according to the present invention will now be described with reference to the flowcharts of FIGS. 9a through 9f and with reference to FIGS. 1 through 8c.

Figure 9A:
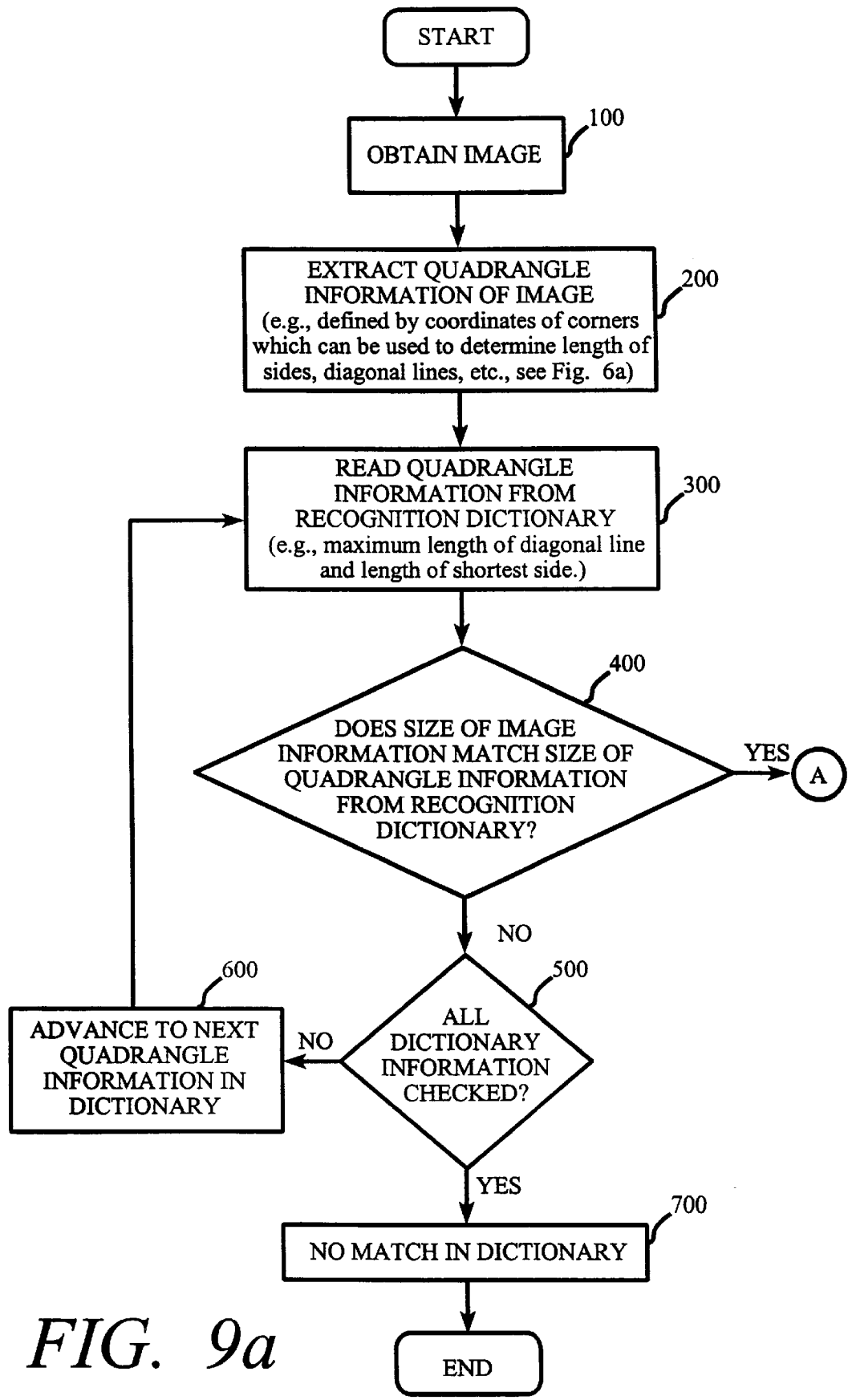
FIGS. 9a through 9f are a flowchart for describing the operation of the image recognition apparatus according to the present invention.

In FIG. 9a, a scanned image is obtained in step 100 via scanner 4 and the RGB data signals are passed to image information extraction unit 20. Next, the quadrangle extraction unit 22 extracts quadrangle information of the object image from the scanned image, for example, as defined by the coordinates of the corners of the object image in step 200. The quadrangle information is used to determine the length of the sides, diagonal lines, etc., of the object image. At step 300, the match determination device 28 reads quadrangle information from the recognition dictionary 26 (e.g., a maximum length of a diagonal line and a length of a shortest side for an inscribing quadrangle of the object image) and flow proceeds to step 400.

At step 400, the match determination device 28 determines whether the size of the extracted quadrangle information of the object image matches the size of the quadrangle information from the recognition dictionary 26. If the quadrangle information obtained from the object image matches the quadrangle information from the recognition dictionary 26, flow proceeds to process A in FIG. 9b. If the size of the quadrangle information extracted from the object image does not match the quadrangle information from the recognition dictionary 26, flow proceeds to step 500.

At step 500, the match determination device 28 determines whether all the information in the recognition dictionary 26 has been checked. If all the information in the recognition dictionary 26 has been checked, flow proceeds to step 700. However, if all the information in the recognition dictionary 26 has not been checked, flow proceeds to step 600. At step 600, the next quadrangle information from the recognition dictionary 26 is advanced and transfer returns to step 300 where the next quadrangle information is read from the recognition dictionary 26.

At step 700, since all of the information in the recognition dictionary 26 has been checked, the match determination device 28 generates a negative match result 30, indicating that the scanned image does not have a match in the recognition dictionary 26.

Figure 9B:
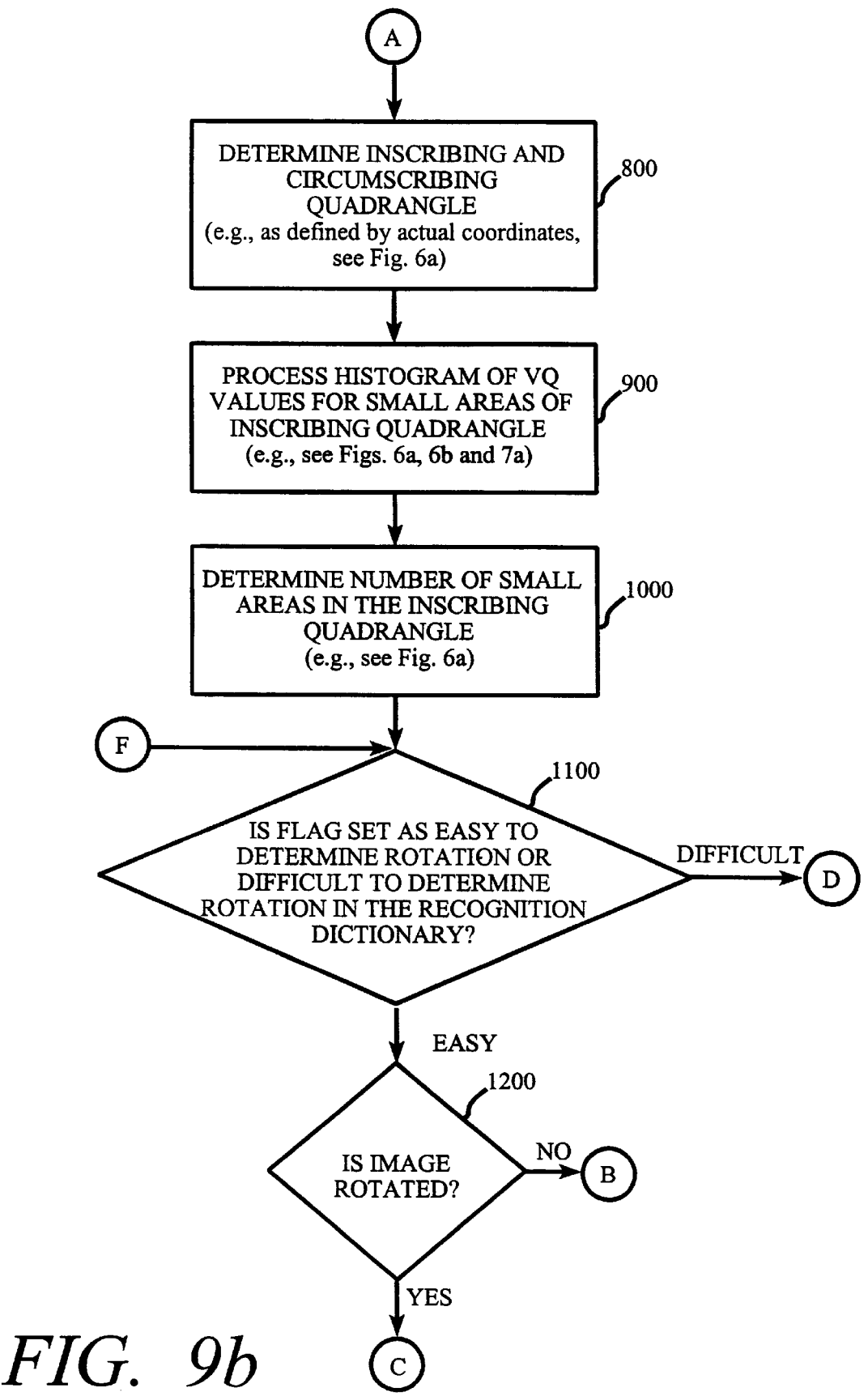

In FIG. 9b, since the size of the image information matches the size of the quadrangle information in the recognition dictionary 26, in step 800 the quadrangle extraction unit 22 determines the inscribing quadrangle BDFH and circumscribing quadrangle ACEG of the object image, as shown, for example, in FIG. 6a. At step 900, the small areas SR of the inscribing quadrangle BDFH are processed using vector quantization processing to extract the chromaticity and vector quantization histograms (e.g., as disclosed in U.S. patent application Ser. No. 08/354,878) and described above with respect to FIGS. 7a and 7b. At step 1000, the quadrangle extraction unit 22 determines the number of small areas in the inscribing quadrangle BDFH as shown, for example, in FIG. 6a.

At step 1100, once the small areas SR of the inscribing quadrangle BDFH have been processed using the vector quantization processing, a determination is made as to whether the flag in the recognition dictionary is set for easy to determine or difficult to determine rotation. If the flag in the recognition dictionary 26 is set for difficult to determine rotation, flow proceeds to process D in FIG. 9e. If the flag in the recognition dictionary 26 is set for easy to determine rotation, flow proceeds to step 1200.

At step 1200, a determination is made as to whether the object image is rotated. If the image is determined not to be rotated, flow proceeds to process B in FIG. 9c. However, if the object image is determined to be rotated, flow proceeds to process C in FIG. 9d.

Figure 9C:
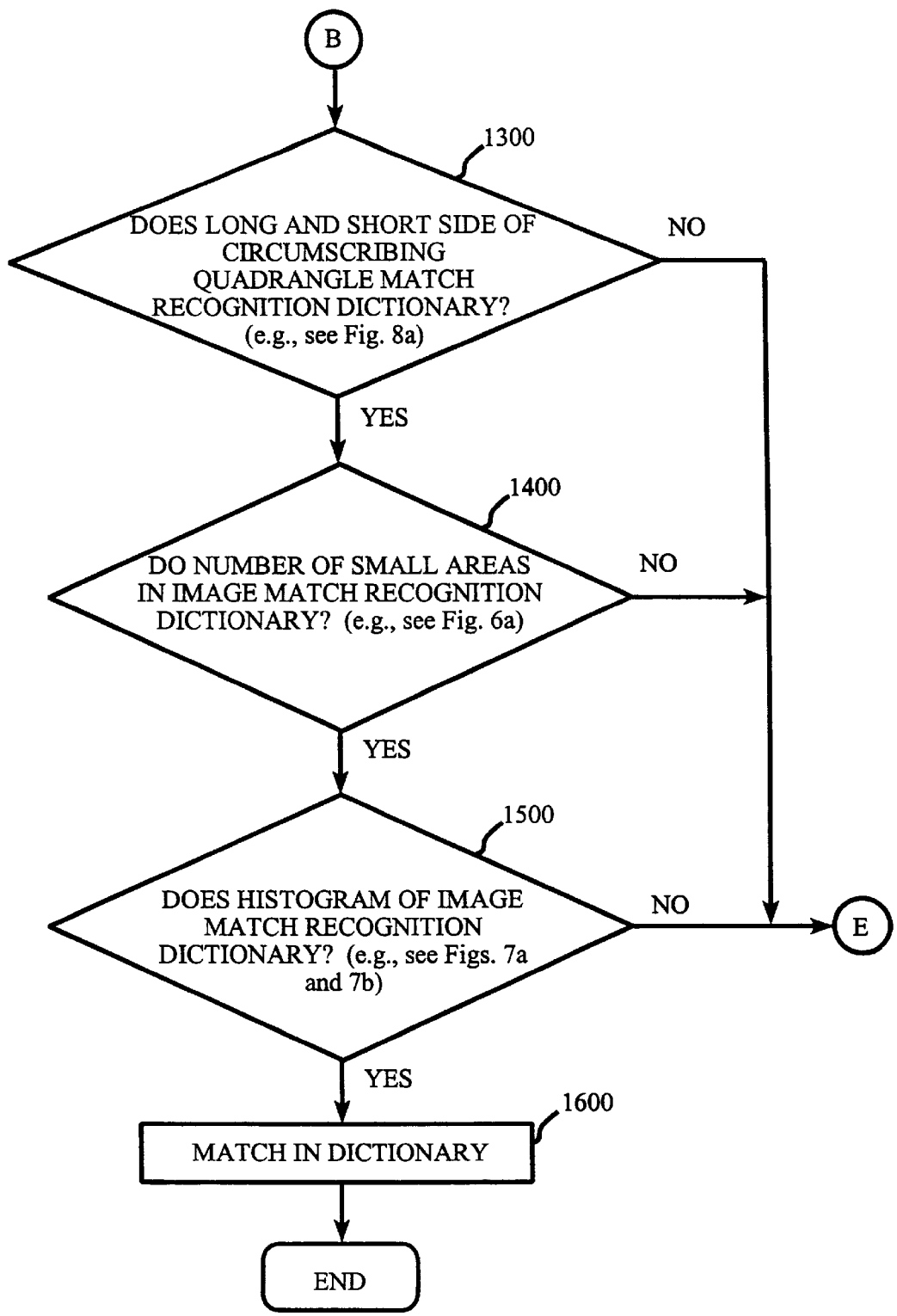

In FIG. 9c, a comparison is made in step 1300 between the long and short side of the circumscribing quadrangle ABCD and the match in the recognition dictionary 26, as shown, for example, in FIG. 8a. If the long and short side of the circumscribing quadrangle ABCD match the information in the recognition dictionary 26, for example, within a predetermined threshold such as 1%, 2%, or 5%, flow proceeds to step 1400. However, if there is no match flow proceeds to process E in FIG. 9f.

At step 1400, a determination is made as to whether the number of small areas SR in the inscribing quadrangle BDFH of the object image matches the information in the recognition dictionary 26, as shown for example in FIG. 6a. If the number of small areas SR do match the information in the recognition dictionary 26, flow proceeds to step 1500. However, if there is no match flow proceeds to process E in FIG. 9f.

At step 1500, the chromaticity and vector quantization histograms of the object image are compared against the information in the recognition dictionary 26, as shown for example in FIGS. 7a and 7b. If the chromaticity and vector quantization histograms of the object image match the information in the recognition dictionary 26, flow proceeds to step 1600. However, if there is no match flow proceeds to process E in FIG. 9f.

At step 1600, since the chromaticity and vector quantization histograms of the object image match the information in the recognition dictionary 26, the match determination device 28 generates a positive match result 30, indicating that the scanned image has a match in the recognition dictionary 26.

Figure 9D:
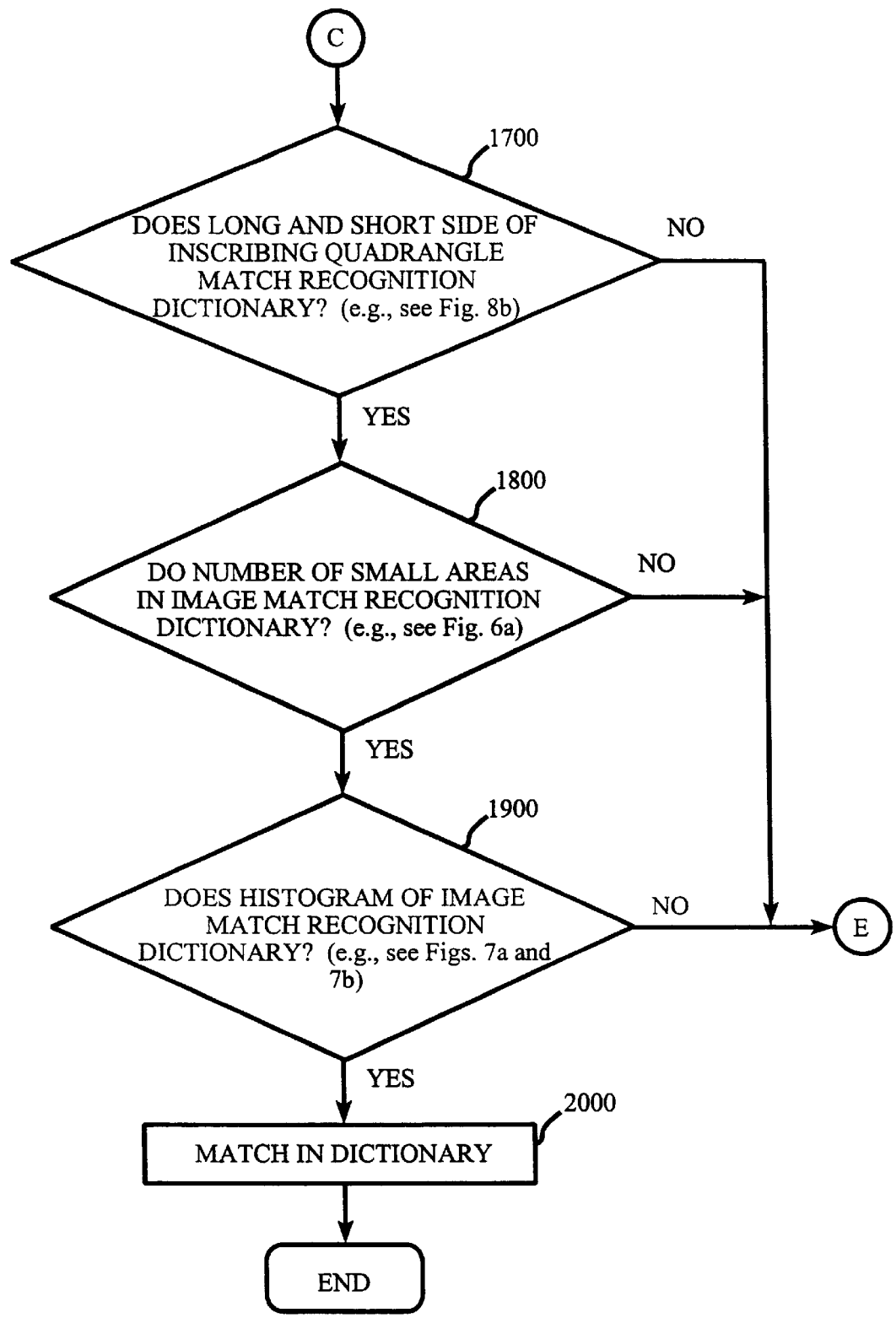

In FIG. 9d, a comparison is made in step 1700 between the long and short side of the inscribing quadrangle BDFH and the match in the recognition dictionary 26, as shown, for example, in FIG. 8b. If the long and short side of the inscribing quadrangle BDFH match the information in the recognition dictionary 26, for example, within a predetermined threshold such as 1%, 2% or 5%, flow proceeds to step 1800. However, if there is no match flow proceeds to process E in FIG. 9f.

At step 1800, a determination is made as to whether the number of small areas SR in the inscribing quadrangle BDFH of the object image match the information in the recognition dictionary 26, as shown for example in FIG. 6a. If the number of small areas SR do match the information in the recognition dictionary 26, flow proceeds to step 1900. However, if there is no match flow proceeds to process E in FIG. 9f.

At step 1900, the chromaticity and vector quantization histograms of the object image are compared against the information in the recognition dictionary 26, as shown for example in FIGS. 7a and 7b. If the chromaticity and vector quantization histograms of the object image match the information in the recognition dictionary 26, flow proceeds to step 2000. However, if there is no match flow proceeds to process E in FIG. 9f. At step 2000, since the chromaticity and vector quantization histograms of the object image match the information in the recognition dictionary 26, the match determination device 28 generates a positive match result 30, indicating that the scanned image has a match in the recognition dictionary 26.

Figure 9E:
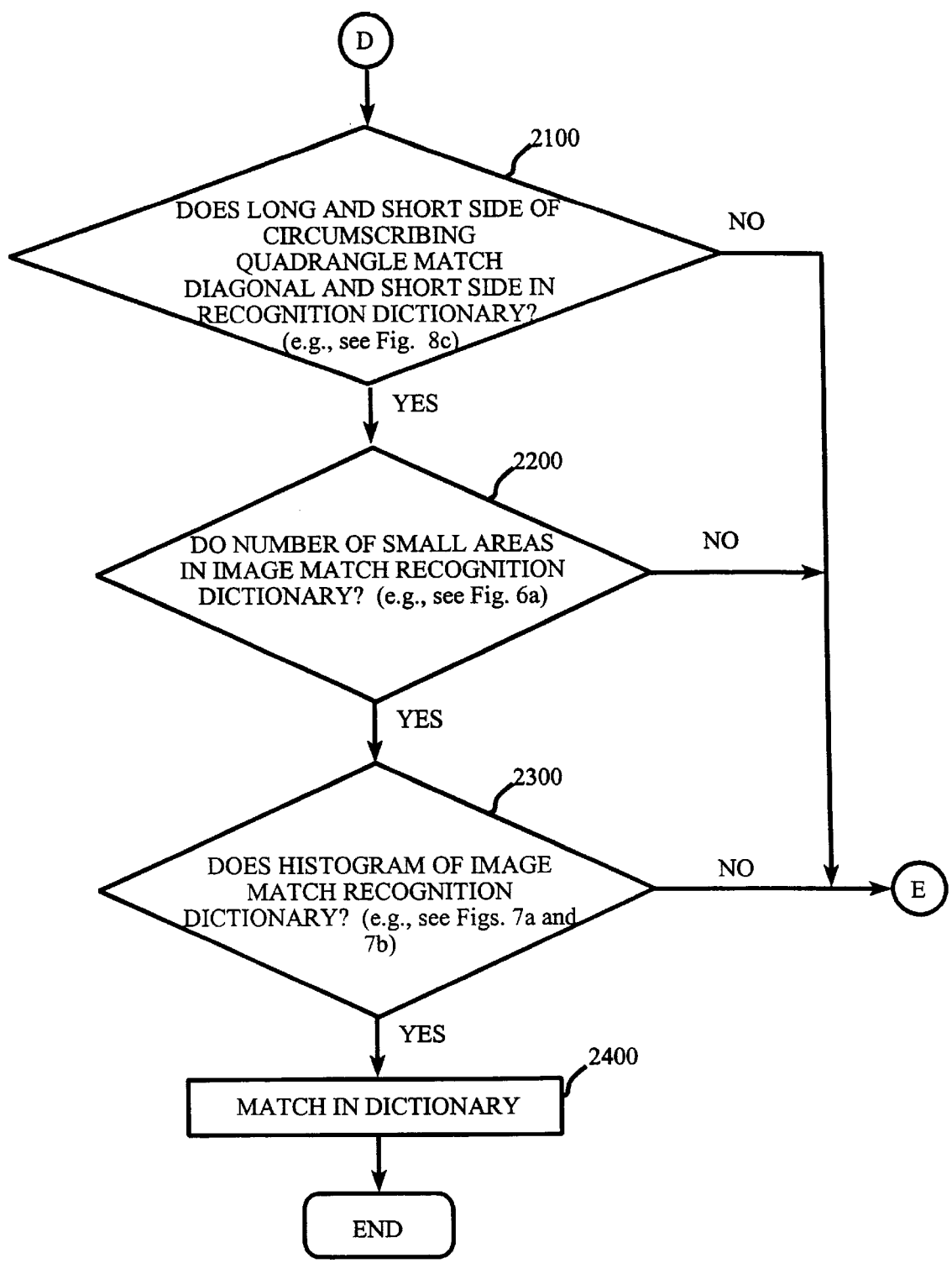

In FIG. 9e, a comparison is made in step 2100 between the long and short side of the circumscribing quadrangle ABCD and the match in the recognition dictionary 26, as shown, for example, in FIG. 8c. If the long and short side of the circumscribing quadrangle ABCD match the information in the recognition dictionary 26, for example, within a predetermined threshold such as 1%, 2%, or 5%, flow proceeds to step 2200. However, if there is no match flow proceeds to process E in FIG. 9f.

At step 2200, a determination is made as to whether the number of small areas SR in the inscribing quadrangle BDFH of the object image match the information in the recognition dictionary 26, as shown for example in FIG. 6a. If the number of small areas SR do match the information in the recognition dictionary 26, flow proceeds to step 2300. However, if there is no match flow proceeds to process E in FIG. 9f.

At step 2300, the chromaticity and vector quantization histograms of the object image are compared against the information in the recognition dictionary 26, as shown for example in FIGS. 7a and 7b. If the chromaticity and vector quantization histograms of the object image match the information in the recognition dictionary 26, flow proceeds to step 2400. However, if there is no match flow proceeds to process E in FIG. 9f. At step 2400, since the chromaticity and vector quantization histograms of the object image match the information in the recognition dictionary 26, the match determination device 28 generates a positive match result 30, indicating that the scanned image has a match in the recognition dictionary 26.

Figure 9F:
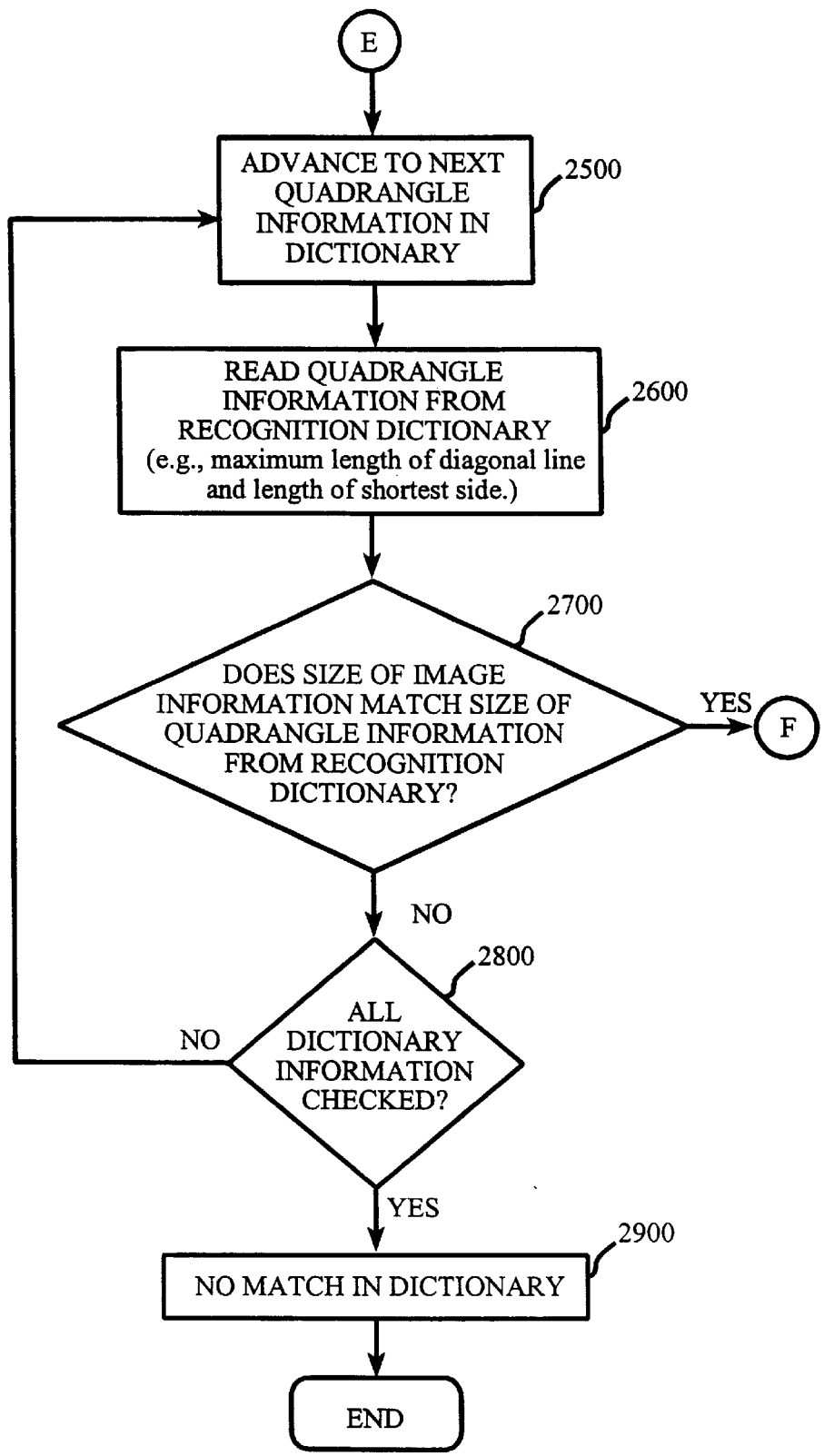

In FIG. 9f, the next quadrangle information from the recognition dictionary 26 is advanced at step 2500 and flow proceeds to step 2600 where the quadrangle information is read from the recognition dictionary 26. At step 2600, the match determination device 28 reads quadrangle information from the recognition dictionary 26 (e.g., a maximum length of a diagonal line and a length of a shortest side for an inscribing quadrangle) and flow proceeds to step 2700.

At step 2700, the match determination device 28 determines whether the size of the extracted quadrangle information of the object image matches the size of the quadrangle information from the recognition dictionary 26. If the information obtained from the object image matches the information from the recognition dictionary 26, flow proceeds to process F in FIG. 9b. If the size of the image information of the object image does not match the information from the recognition dictionary 26, flow proceeds to step 2800.

At step 2800, the match determination device 28 determines whether all the information in the recognition dictionary 26 has been checked. If all the information in the recognition dictionary 26 has been checked, flow proceeds to step 2900. However, if all the information in the recognition dictionary 26 has not been checked, transfer returns to step 2500. At step 2900, since all of the information in the recognition dictionary 26 has been checked, the match determination device 28 generates a negative match result 30, indicating that the scanned image does not have a match in the recognition dictionary 26.

Although in the preferred embodiment the image recognition apparatus includes a microprocessor 2 with RAM 6 and ROM 10, this invention may be implemented using a conventional general purpose digital computer or microprocessor programmed according to the teachings of the present specification, as will be apparent to those skilled in the computer arts. Appropriate software coding can readily be prepared by skilled programmers based on the teachings of the present disclosure, as will be apparent to those skilled in the software arts. The invention may also be implemented by the preparation of application specific integrated circuits or by interconnecting an appropriate network of conventional component circuits, as will be readily apparent to those skilled in the electronic arts.

Although the image recognition apparatus is described in terms of recognizing a color image, the present invention may also be used for detecting and/or prohibiting illegal activities, such as the forgery of specific documents, such as notes, currency, or negotiable instruments, on a color image processing apparatus, such as a color copying machine or a personal computer system with an image scanner, as will be apparent to those skilled in the electronic arts. Once the specific image is detected in the object image as shown in steps 1600, 2000 and 2400, the color image processing apparatus prohibits copying of the object image if the object image matches image information in a recognition dictionary for the specific image. The reference data in the recognition dictionary is provided by sampling specific images such as currency, notes, or negotiable instruments. When a negative match result 30 is generated as shown in steps 700 and 2900, copying of the object image is allowed and the printer 8 generates a copy of the scanned image. However, when a positive match result 30 is generated as shown in steps 1600, 2000 and 2400, copying of the object image is inhibited and a message such as an audible and/or visual message may be indicated which warns that an image was attempted to be copied which is prohibited from being copied. Also, the image may be copied but only one color or certain colors are used to clearly show that the copy is only a copy and is clearly not an original.

The present invention includes a computer program product which may be on a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An image recognition method for recognizing a specific image, comprising the steps of:
   obtaining image signals from a scanned image;
   extracting an object image from said image signals as a candidate for recognition of said specific image;
   extracting feature values from said object image using said image signals;
   obtaining features of said specific image from a reference dictionary including a rotation characteristic indicating an ease in ability to determine a rotation of said specific image;
   comparing said extracted feature values from said object image with said obtained features of said specific image from said reference dictionary using an analysis which is based on said rotation characteristic of said specific image; and
   generating a recognition result based on a result of said analysis of said comparing step.

2. The image recognition method according to claim 1, wherein said step of extracting feature values from said object image further comprises:
   extracting quadrangle data of said object image from said extracted feature values of said object image.

3. The image recognition method according to claim 1, wherein said step of comparing said extracted feature values from said object image further comprises:
   comparing said extracted feature values from said object image with features from a plurality of specific images from said reference dictionary.

4. The image recognition method according to claim 1, wherein said step of comparing said extracted feature values from said object image further comprises:

detecting a rotation of said object image based on said rotation characteristic of said reference data for said specific image.

5. The image recognition method according to claim 2, wherein said step of comparing said extracted feature values from said object image further comprises:

detecting a rotation of said object image using said quadrangle data.

6. The image recognition method according to claim 5, wherein said step of extracting feature values from said object image further comprises:

extracting coordinates of a circumscribing quadrangle of said object image from said quadrangle data.

7. The image recognition method according to claim 5, wherein said step of extracting feature values from said object image further comprises:

extracting coordinates of an inscribing quadrangle of said object image from said quadrangle data.

8. The image recognition method according to claim 6, wherein said step of comparing said extracted feature values from said object image further comprises:

using said coordinates of said circumscribing quadrangle of said object image to detect said specific image when said step of detecting a rotation of said object image detects rotation of said object image.

9. The image recognition method according to claim 7, wherein said step of comparing said extracted feature values from said object image further comprises:

using said coordinates of said inscribing quadrangle of said object image to detect said specific image when said step of detecting a rotation of said object image detects no rotation of said object image.

10. An image recognition apparatus for recognizing a specific image, comprising:

a scanning device for obtaining image signals from a scanned image;

a quadrangle extraction device for extracting an object image from said image signals as a candidate for recognition of said specific image and for extracting feature values from said object image using said image signals;

a reference dictionary for storing features of said specific image including a rotation characteristic indicating an ease in ability to determine a rotation of said specific image; and a match determination device for obtaining features of said specific image from said reference dictionary, for comparing said extracted feature values from said object image with said obtained features of said specific image from said reference dictionary using an analysis which is based on said rotation characteristic of said specific image, and for generating a recognition result based on said analysis.

11. The image recognition apparatus according to claim 10, wherein said quadrangle extraction device comprises:

means for extracting quadrangle data of said object image from said extracted feature values of said object image.

12. The image recognition apparatus according to claim 10, wherein said match determination device comprises:

means for comparing said extracted feature values from said object image with features from a plurality of specific images from said reference dictionary.

13. The image recognition apparatus according to claim 10, wherein said match determination device comprises:

means for detecting a rotation of said object image based on said rotation characteristic of said reference data for said specific image.

14. The image recognition apparatus according to claim 11, wherein said match determination device further comprises:

means for detecting a rotation of said object image using said quadrangle data.

15. The image recognition apparatus according to claim 14, wherein said quadrangle extraction device further comprises:

means for extracting coordinates of a circumscribing quadrangle of said object image from said quadrangle data.

16. The image recognition apparatus according to claim 14, wherein said quadrangle extraction device further comprises:

means for extracting coordinates of an inscribing quadrangle of said object image from said quadrangle data.

17. The image recognition apparatus according to claim 15, wherein said match determination device further comprises:

means for using said coordinates of said circumscribing quadrangle of said object image to detect said specific image when said means for detecting a rotation of said object image detects rotation of said object image.

18. The image recognition apparatus according to claim 16, wherein said match determination device further comprises:

means for using said coordinates of said inscribing quadrangle of said object image to detect said specific image when said means for detecting a rotation of said object image detects no rotation of said object image.

19. A computer program product, comprising:

a computer storage medium and a computer program code mechanism embedded in the computer storage medium for causing a computer to recognizing a specific image, the computer program code mechanism comprising:

a first computer code device for obtaining image signals from a scanned image;

a second computer code device for extracting an object image from said image signals as a candidate for recognition of said specific image;

a third computer code device for extracting feature values from said object image using said image signals;

a fourth computer code device for obtaining features of said specific image from a reference dictionary including a rotation characteristic indicating an ease in ability to determine a rotation of said specific image;

a fifth computer code device for comparing said extracted feature values from said object image with said obtained features of said specific image from said reference dictionary using an analysis which is based on said rotation characteristic of said specific image; and a sixth computer code device for generating a recognition result based on said analysis.

* * * * *